(No Model.)
O. BURGHER.
HORSE SCUFFLE HOE.
No. 275,462. Patented Apr. 10, 1883.
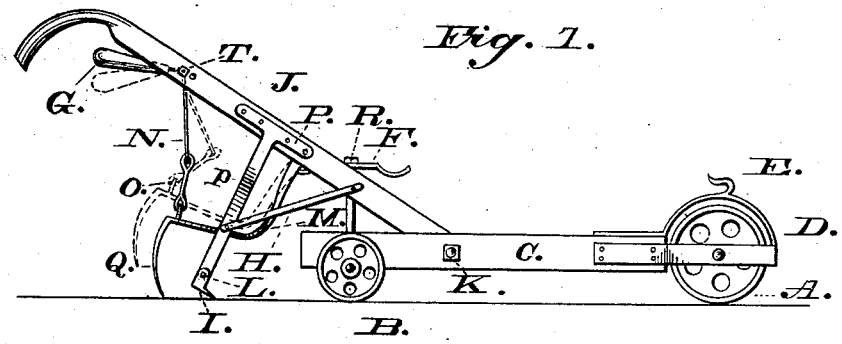
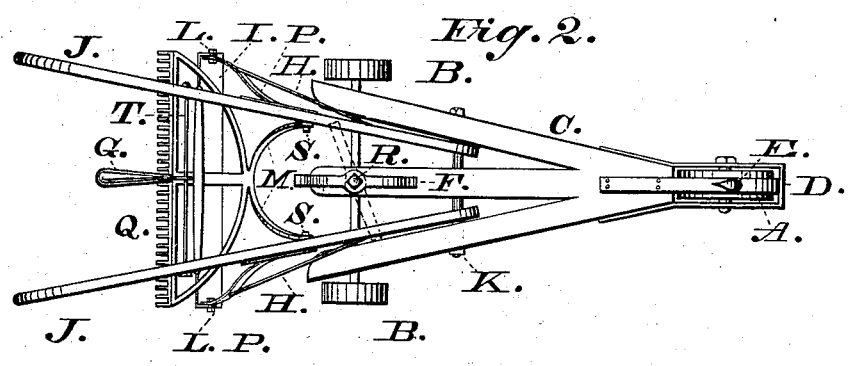
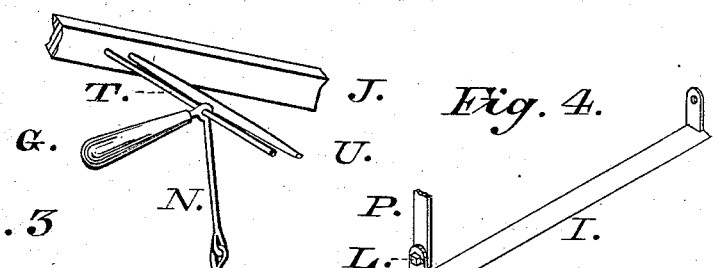
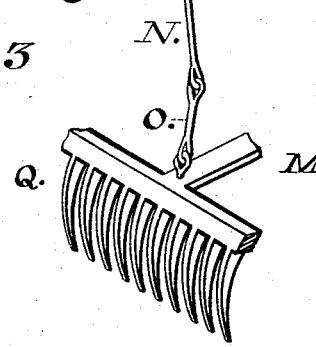
Witnesses.
Arnout Cannon
Michael J. Lawlor
Inventor:
Orlando Burgher
per A. B. Smith
Attorney.

UNITED STATES PATENT OFFICE.

ORLANDO BURGHER, OF POUGHKEEPSIE, NEW YORK.

HORSE SCUFFLE-HOE.

SPECIFICATION forming part of Letters Patent No. 275,462, dated April 10, 1883.

Application filed October 17, 1882. (No model.)

*To all whom it may concern:*

Be it known that I, ORLANDO BURGHER, a citizen of the United States, residing at Poughkeepsie, in the county of Dutchess and State of New York, have invented a new and useful Horse Scuffle-Hoe, of which the following is a specification.

My invention relates to improvements in scuffle-hoes and the operation of the same by horse-power.

The object of my invention is to furnish an agricultural implement that may be drawn by a horse, and which will scarify the surface of the ground like the common scuffle-hoe, cutting off all weeds at any desired depth and gathering the weeds in piles; and my implement is also well adapted to the removal of weeds from walks and smoothing the surface of walks and roadways, and may also be used to remove weeds from the space between rows of vegetables, trees, or plants. I accomplish my purpose by direct draft. I attain these objects by the mechanism illustrated in the accompanying drawings, in which—

Figure 1 is a side view of the entire machine. Fig. 2 is a top view. Fig. 3 is a view of a section of the rake and one handle of the hoe. Fig. 4 is a view of the cutter-bar detached from the machine.

Similar letters refer to similar parts.

The frame shown, Fig. 2, is that of an ordinary cultivator consisting of three pieces of iron or wood firmly bolted or riveted. A clevis or other equivalent device is attached to the front end, by which it is attached to the whiffletree, the whole frame being sustained by three wheels, as shown, Figs. 1 and 2. At a point about two-thirds of the length of the frame from the front an iron bolt is passed through the beams of the frame, upon which the handles of the scuffle-hoe are pivoted, and these handles are held apart and in position by a round, U, Figs. 2 and 3. Each of the handles have rigidly attached to them a T-shaped arm extending downward to the ground a little in rear of the frame, as shown, P P. These arms are sustained in their positions by braces H, reaching to the handles, as shown. These arms sustain the cutter-bar I, secured to the slotted lower ends by bolts and nuts, so that the cutter-bar can be set or adjusted at any desired angle and firmly held. To the handles J J, at the points S S, are pivoted two arms, M, which unite and sustain the rake Q in position just behind the cutter-bar, so that the teeth of the rake will strike the ground behind the bar and gather up the weeds. This rake is connected in nearly a vertical direction with a rectangular lever operated on the round between the handles, so that the rake can be raised at pleasure without lifting the cutter-bar from the ground. On the rear end of the middle bar of the frame I place an upright post, R, which supports a horizontal revolving rest of sufficient height to disengage the cutter-bar from the ground when revolved under the handles for the purpose of transporting the machine when not in operation.

Having thus described my invention and its manner of construction and operation, what I claim, and desire to obtain Letters Patent for, is—

1. The combination, with the cultivator frame and wheels, of the handles J, T-shaped arms P, adjustable cutter I, pivoted arms M, rake Q, and lever G, substantially as shown and described.

2. The combination, with the frame, and the pivoted handles carrying the adjustable cutter-bar and adjustable rake, of the rotating rest R, adapted to receive the handles and support the operative parts above the ground, substantially as shown and described.

ORLANDO BURGHER.

Witnesses:
ARNOUT CANNON, Jr.,
MICHAEL J. LAWLOR.